United States Patent
Dinwoodie et al.

[11] Patent Number: 6,148,570
[45] Date of Patent: Nov. 21, 2000

[54] PHOTOVOLTAIC BUILDING ASSEMBLY WITH CONTINUOUS INSULATION LAYER

[75] Inventors: Thomas L. Dinwoodie, Piedmont; Adam D. Jackaway, Berkeley; Timothy M. Mueller, Oakland; Daniel S. Shugar, San Bruno, all of Calif.

[73] Assignee: PowerLight Corporation, Berkeley, Calif.

[21] Appl. No.: 09/019,427

[22] Filed: Feb. 5, 1998

[51] Int. Cl.⁷ .................................................... E04O 13/18
[52] U.S. Cl. .................... 52/173.3; 52/302.1; 52/506.06; 52/745.13; 136/244
[58] Field of Search .............................. 52/173.3, 506.06, 52/302.1, 302.3, 745.13; 136/244, 291

[56] References Cited

U.S. PATENT DOCUMENTS

| | | |
|---|---|---|
| 3,769,091 | 10/1973 | Leinkram et al. . |
| 4,040,867 | 8/1977 | Forestieri et al. . |
| 4,189,881 | 2/1980 | Hawley . |
| 4,321,416 | 3/1982 | Tennant . |
| 4,389,533 | 6/1983 | Ames . |
| 4,674,244 | 6/1987 | Francovitch . |
| 4,677,248 | 6/1987 | Lacey . |
| 4,835,918 | 6/1989 | Dippel . |
| 4,860,509 | 8/1989 | Laaly et al. . |
| 4,886,554 | 12/1989 | Woodring et al. . |
| 5,092,939 | 3/1992 | Nath et al. . |
| 5,112,408 | 5/1992 | Melchior . |
| 5,316,592 | 5/1994 | Dinwoodie . |
| 5,338,369 | 8/1994 | Rawlings . |
| 5,505,788 | 4/1996 | Dinwoodie . |
| 5,524,381 | 6/1996 | Chahroudi ............................ 52/173.3 X |
| 5,524,401 | 6/1996 | Ishikawa et al. . |
| 5,647,915 | 7/1997 | Zukerman . |
| 5,768,831 | 6/1998 | Melchior ................................ 52/173.3 |
| 5,787,653 | 6/1998 | Sakai et al. ............................. 52/173.3 |

FOREIGN PATENT DOCUMENTS

| | | |
|---|---|---|
| 3611542 | 8/1987 | Germany . |
| 59175168 | 10/1984 | Japan . |
| 59175169 | 10/1984 | Japan . |
| 3-200376 | 2/1991 | Japan . |
| 05280168 | 10/1993 | Japan . |

OTHER PUBLICATIONS

Product Info: PowerLight Corporation, PowerGuard™ System Description / Product Description, 1995.

Product Info: Roof Science Corporation, WhiteCap Radiative Cooling Systems, 1998.

Product Info: Roof Science Corporation, WhiteCap Integrated Cooling, 1998.

*Primary Examiner*—Christopher T. Kent
*Attorney, Agent, or Firm*—Townsend and Townsend and Crew LLP

[57] ABSTRACT

A photovoltaic building assembly (2) includes a building support surface, typically a roof (4) or a wall (6), on which a PV module support assembly (12) is mounted. The support assembly includes a base (18) secured to the support surface, and an upper portion (14, 16; 14a, 31, 33). A PV module (10) is mounted to and is supported by the body (14, 14a) of the upper portion. A foam insulation layer (22) is sprayed onto the support surface to embed the base and lower ends of the legs therein. A weather-resistant layer (24) is applied to the outer surface of the insulation layer to prevent moisture from reaching the building surface. The base can be secured to the building support surface by an adhesive (32) or by mechanical fasteners (34) as well as by simply embedding the base within the insulation layer. The assembly provides for electricity generation, building thermal insulation and building waterproofing in a lightweight construction assembly.

60 Claims, 7 Drawing Sheets

PHOTOVOLTAIC BUILDING ASSEMBLY WITH CONTINUOUS INSULATION LAYER

CROSS-REFERENCE TO RELATED APPLICATIONS

This application is related to U.S. Pat. No. 5,316,592, issued May 31, 1994 to Dinwoodie, and U.S. Pat. No. 5,505,788, issued Apr. 19, 1996 to Dinwoodie, and U.S. patent application Ser. No. 08/629,052, now U.S. Pat. No. 5,746,839, issued May 5, 1998 to Dinwoodie.

BACKGROUND OF THE INVENTION

This invention relates generally to photovoltaic (PV) building assemblies, and in particular to an assembly which provides for photovoltaic power generation, thermal insulation and waterproofing in a simple, lightweight and cost-efficient construction assembly.

The promise of photovoltaic power, free power from the sun, has proven to be more elusive than originally envisioned. Initially, two of the biggest problems were high cost for PV modules and low efficiencies. However, in recent years the cost per watt has dropped for photovoltaic units that are integrated into the skin of a building. This avoids one of the problems facing photovoltaic assemblies, which is that they constitute an extra layer covering the roofing or siding surface of the building or other structure. By integrating into the building surface, the expense to the construction of the building of adding an additional layer is avoided.

SUMMARY OF THE INVENTION

The present invention is directed to a photovoltaic building assembly which not only provides for photovoltaic electricity generation but also provides thermal insulation and waterproofing for the building in a lightweight, cost-effective construction assembly.

The photovoltaic building assembly includes a building support surface on which a pattern of PV module support assemblies are arranged. Each support assembly has a base, adjacent to the building surface, and an outwardly extending portion. A continuous insulation layer, preferably a sprayed-on foam insulation layer, is applied to cover the building surface and the bases. A PV module is mounted to and is supported by the outwardly extending portion above the insulation layer.

The outer surface of the insulation layer preferably has a weatherproof coating preventing moisture from reaching the building surface. The base can be secured to the building support surface, typically a roof or a wall, in a variety of ways. The base can be affixed to the building support surface by an adhesive or through the use of mechanical fasteners which may, or may not, penetrate the support surface. Also, the base may be sized so that embedding the base within the insulation layer is all which is needed to secure the PV module support assembly to the building support surface.

The PV module support assembly is preferably constructed so that an air cavity is formed between the continuous insulation layer and the PV module to provide for air cooling of the PV module. However, if desired, thermal conduits can be mounted adjacent to the underside of the PV modules to remove excess heat from, or supply heat to, the PV modules when the system is used as a hybrid PV/thermal system. The invention is useful in both new construction and retrofit applications; in either case the invention can be used as the sole roof waterproofing membrane or as a supplemental waterproofing mechanism covering a conventional waterproofing membrane.

In retrofit applications, the invention has the ability to provide roof leveling or roof sloping, such as where roof sagging has thwarted intended drainage courses. Also, because the PV module is typically spaced-apart above the continuous insulation layer, the PV modules can span low-lying roof penetrations and obstructions.

The invention can thus reduce the cost of conventional building materials and their installation by displacing the need for conventional waterproofing membranes, while enhancing the value of the constructed building. The resulting structure also provides social benefits by reducing fuel consumption thus contributing to reduction in air pollution and global warming.

Other features and advantages of the invention will appear from the following description in which the preferred embodiments have been set forth in detail in conjunction with the company drawings.

BRIEF DESCRIPTION OF THE DRAWINGS

FIG. 5b is an enlarged overall view of the hold-down and base of the PV module support assembly of FIG. 5a;

DESCRIPTION OF THE PREFERRED EMBODIMENT

Figure 1:
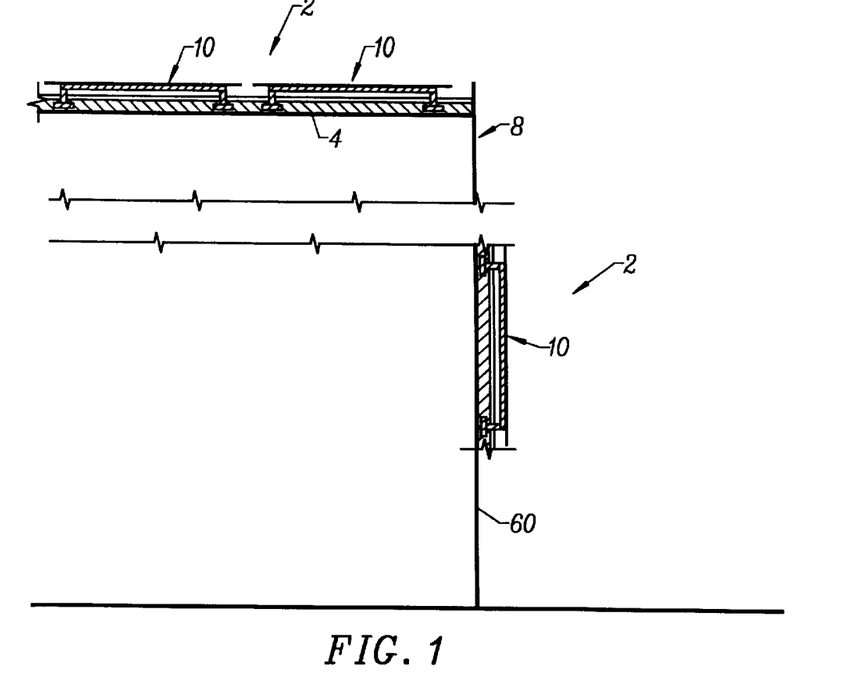
FIG. 1 is a simplified side cross-sectional view of a building showing PV building assemblies in both roofing and cladding configurations.
Figure 2:
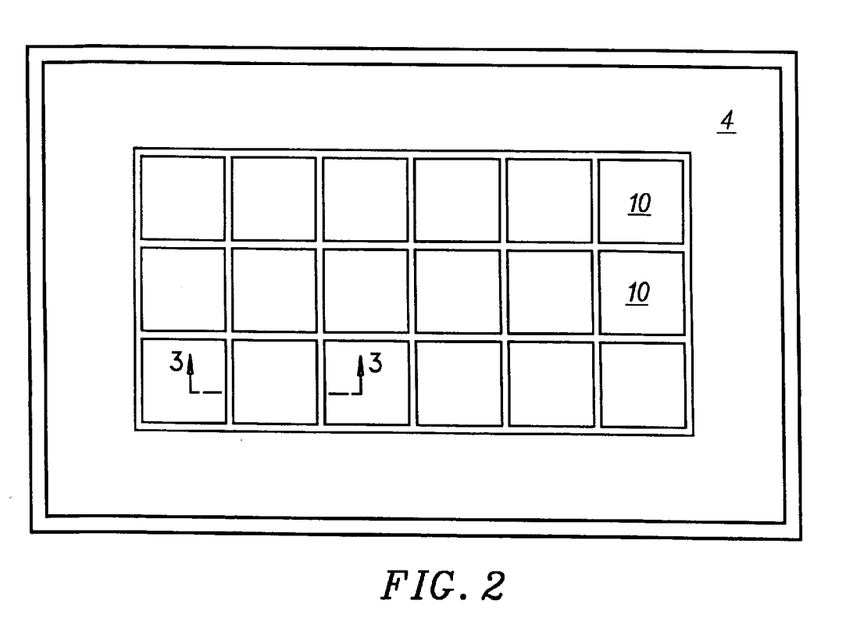
FIG. 2 is a simplified plan view showing the roof of the building of FIG. 1 and an array of photovoltaic modules.

FIG. 1 illustrates a photovoltaic (PV) building assembly 2 mounted to the roof 4 and side 6 of a building 8. Each PV building assembly 2 includes an array of PV modules 10. Each PV module 10 typically includes one or more PV cells mounted to a support substrate. FIG. 2 illustrates an array of 18 PV modules 10 mounted to roof 4. In the preferred embodiment, roof 4 is illustrated as a flat roof. However, roof 4 could also be a sloped roof. Side 6 is illustrated as being vertical; it could be other than vertical as well. PV building assemblies 2 can be substantially the same, whether they are mounted on a roof 4 or a side 6.

Figure 3:
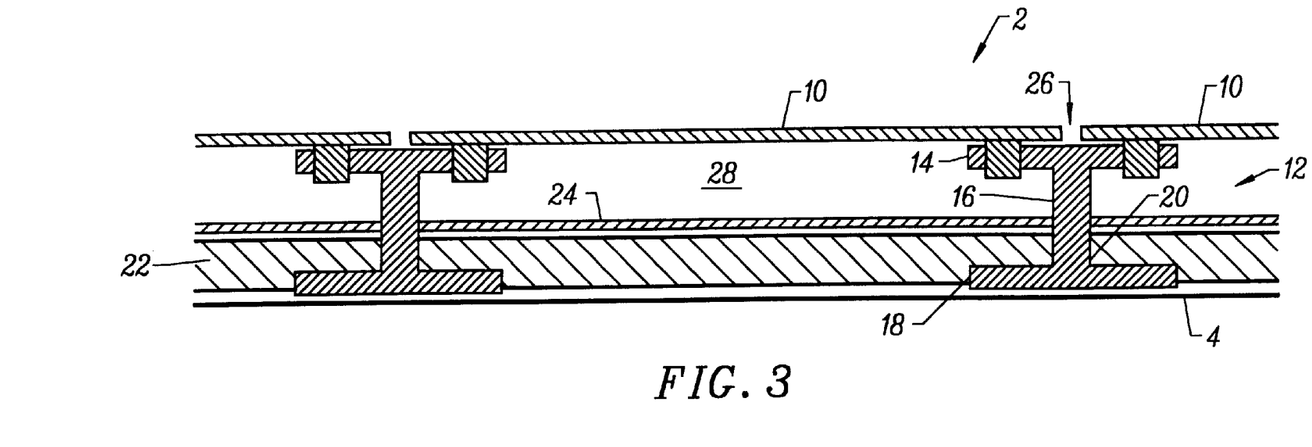
FIG. 3 is a side cross-sectional view taken along line 3—3 of FIG. 2.

FIG. 3 provides an enlarged cross-sectional view of a first embodiment of a PV building assembly 2 made according to the invention. Assembly 2 includes a plurality of PV module support assemblies 12 which support PV modules 10 above roof 4. Each support assembly 12 includes a body 14, to which PV modules 10 are secured, legs 16, which support body 14, and bases 18. PV modules 10 are secured to body 14 using a variety of techniques including adhesives, clips, threaded fasteners, clamps, rivets, etc. The distal ends 20 of legs 16 are secured to bases 18; in the preferred embodiment body 14, leg 16 and base 18 are a unitary part made of metal such as aluminum, galvanized steel, concrete, composite materials, fiberglass or plastics.

Base 18 is embedded within a continuous insulation layer 22, typically polyurethane foam applied to roof 4 by spraying. In the figures, a small space is shown to exist between insulation layer 22 and roof 4 and between base 18 and roof 4 for purposes of illustration. In practice, base 18, in the embodiment of FIG. 3, rests against roof 4 and insulation layer 22 contacts and adheres to roof 4 as well. The act of embedding base 18 within insulation layer 22 may provide all the hold-down force required to secure support assembly 12 to roof 4. This will be discussed in more detail with reference to FIG. 7. However, as will be discussed with reference to FIGS. 8–10, additional securement of support assembly 12 to roof 4 and side 6 may be used.

Also illustrated in FIG. 3 is a weather-resistant layer 24 typically made of an elastomeric or acrylic coating such as FLEXGuard manufactured by Gers International. Weather-resistant layer 24 is typically applied as a liquid or semi-liquid onto the outer surface of insulation layer 22 to ensure a water-tight surface for the assembly. Again, weather-resistant layer 24 is shown with an air gap between it and insulation layer 22 for purposes of illustration.

PV modules 10 are shown with gaps 26 between the modules which provide for air venting from air cavities 28 created between modules 10 and insulation layer 22. Use of air cavity 28 helps to facilitate air pressure equalization between the top and bottom of PV module 10, thus reducing forces of wind uplift. Gaps 26 also permit water to drain away from PV module 10 onto weather-resistant layer 24, where the water can be drained away from roof 4.

Figure 4:
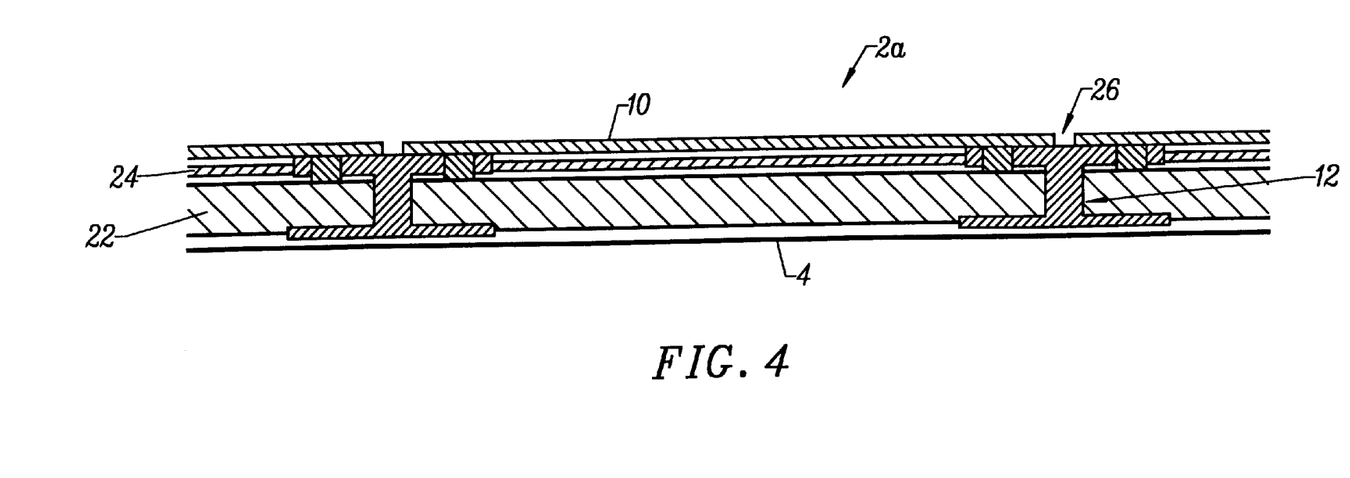
FIG. 4 is a view similar to that of FIG. 3, but of an embodiment where the air cavity between the continuous insulation layer and the PV module is substantially eliminated.

FIG. 4 illustrates a PV building assembly 2a similar to that of FIG. 2 but wherein air cavity 28 is eliminated. This embodiment may be useful when cooling of the lower surface of PV modules 10 is not needed, such as with amorphous silicon PV material, or where a decrease in PV efficiency is acceptable.

Figure 5:
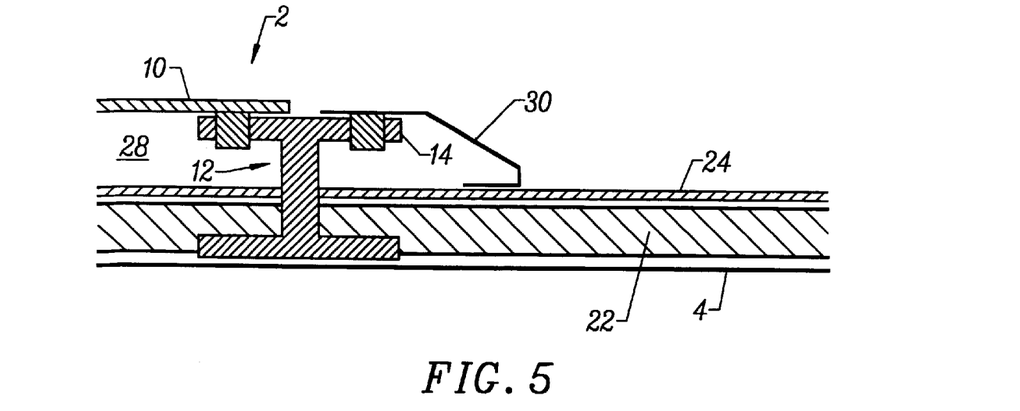
FIG. 5 shows the use of a hollow perimeter unit adjacent to the outer edge of a PV module.

FIG. 5 illustrates PV building assembly 2 together with a perimeter unit 30. Perimeter unit 30 is shown as a formed metal perimeter unit with the top portion secured to body 14 of assembly 12, typically using, for example, an adhesive, a threaded fastener or a clip. Perimeter unit 30 may alternately be constructed of, for example, foam, plastic, or other materials. The hollow perimeter unit 30 can be used to house various wires and conduits. Perimeter unit 30 could be configured to provide a walkway about the perimeter of an array of PV modules 10. Perimeter unit 30 may be fastened to roof 4 using an adhesive to secure unit 30 to layers 22, 24, with roof penetrations or loose laid. Conventional, relatively heavy pavers could be used along the perimeter of an array of PV modules 10, the weight of the pavers maintaining the pavers in position. In addition, perimeter unit 30 could be embedded within insulation layer 22.

Figure 5A:
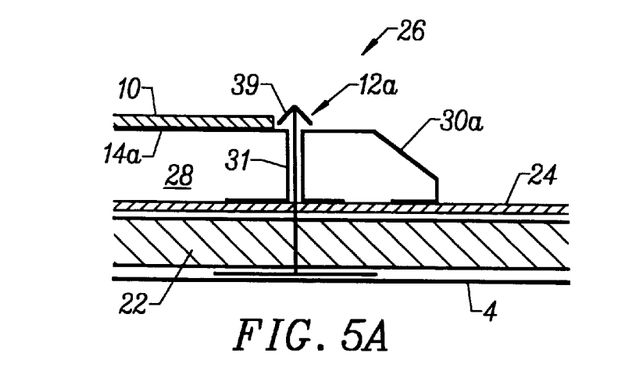
FIG. 5a is a view similar to FIG. 5 but using alternative embodiments of the PV module support assembly and hollow perimeter unit of FIG. 5.
Figure 5B:
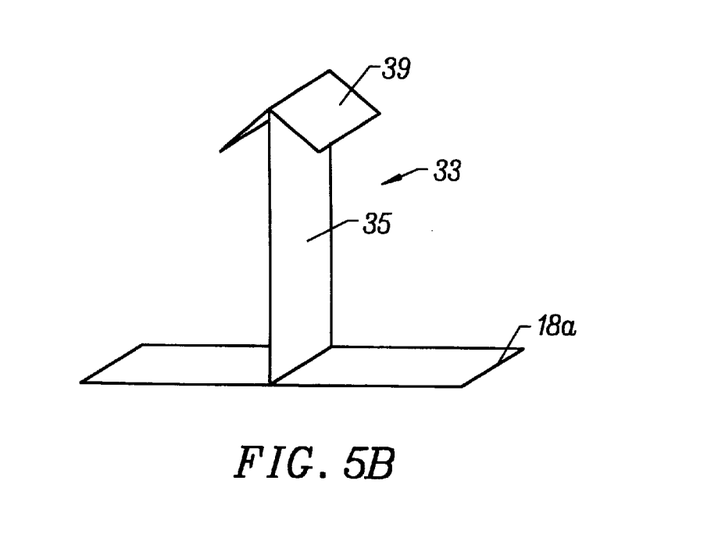

FIG. 5a illustrates an alternative embodiment of the assembly of FIG. 5. In the embodiment of FIG. 5, support assembly 12 can be thought of as comprising a lower portion (that is base 18) and an upper portion (that is body 14 and legs 16). In the embodiment of FIG. 5a assembly 12a also comprises a lower portion (base 18a, see FIG. 5b) and an upper, outwardly-extending portion (body 14a, an L-shaped stand-off 31, and a hold-down 33). Stand-off 31 is preferably a continuous extension of body 14a. As shown better in FIG. 5b, hold-down 33 comprises an extension 35 and a pair of resilient keepers 39. Keepers 39 will flex inwardly to permit the combination of PV module 10, body 14a and stand-offs 31 to deflect keepers 39 downwardly when snapped into place. Instead of engaging body 14a and the upper surface of perimeter units 30a, hold-down 33 could be constructed to engage stand-offs 31 and perimeter units 30a at their lower ends adjacent layer 24.

Figure 6:
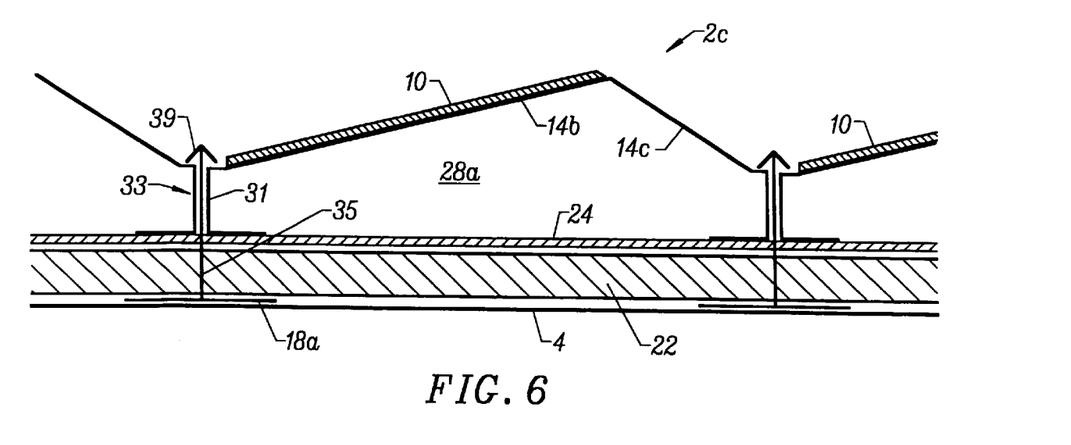
FIG. 6 is a view similar to that of FIG. 3, but using the PV module support assemblies of FIG. 5a showing an embodiment with sloped PV modules.
Figure 6A:
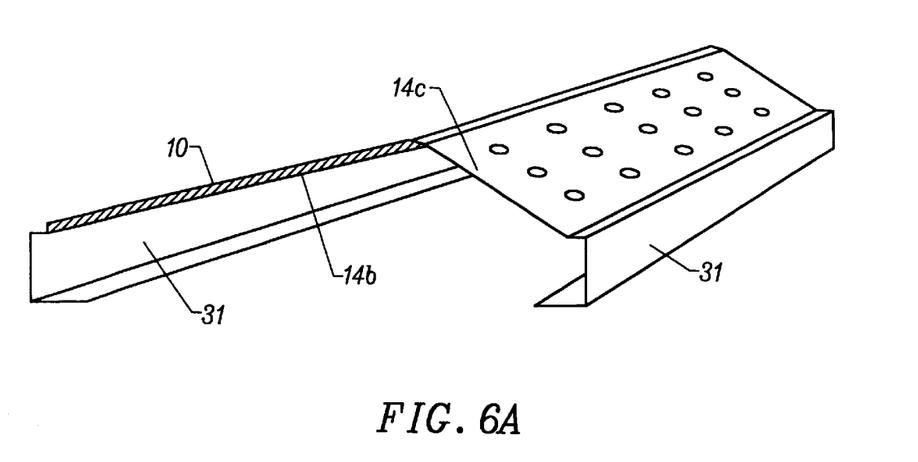
FIG. 6a is an enlarged perspective view of the body and stand-off of FIG. 6 illustrating vent holes in the portion of the body not covered by a PV module.

FIG. 6 illustrates a further embodiment of the invention. PV building assembly 2c includes PV modules 10 sloped to change their relative inclination to the sun and to modify the wind forces on assembly 2c. FIG. 6a illustrates a perspective view of a portion of body portions 14b, 14c and stand-offs 31 of FIG. 6, showing the outer surface of body portion 14c which serves as wind deflector. Body portion 14c may be perforated to, as shown, allow ventilation of air cavity 28a. Please see Dinwoodie U.S. Pat. Nos. 5,316,592 and 5,505,788 and Dinwoodie U.S. patent application Ser. No. 08/629,052, filed Apr. 8, 1996, now U.S. Pat. No. 5,746,839.

Figure 7:
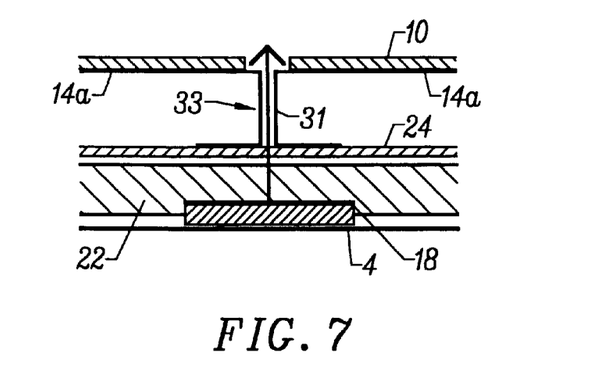
FIG. 7 is an enlarged view illustrating a footer or base loose-laid on a roofing surface, the footer or base relying on its weight to help secure the assembly to the building surface.

FIG. 7 illustrates base 18 loose-laid on roof 4. In this situation, PV building assembly 2 relies on the adhesion of insulation layer 22 to roof 4 and the fact that base 18 is large enough that it would not pull out of the insulation layer to keep PV building assembly mounted to roof 4. Also, base 18 could be made heavy enough to make a significant contribution to maintaining assembly 2 mounted to roof 4.

Figure 8:
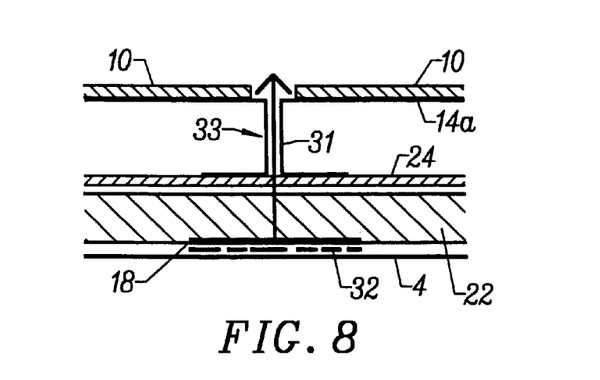
FIG. 8 illustrates adhering the base to the building surface with an adhesive.
Figure 9:
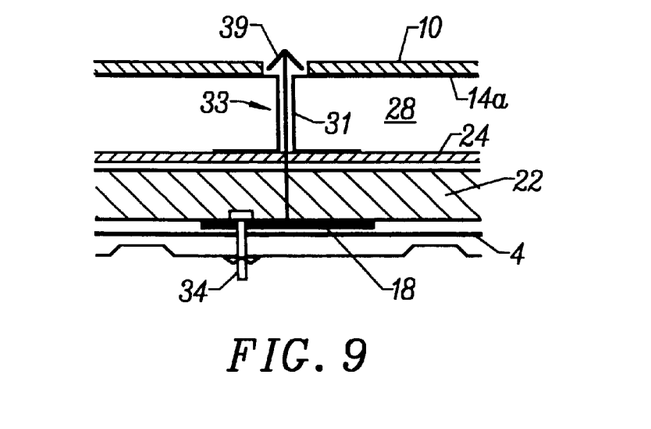
FIG. 9 illustrates the use of a mechanical fastener to secure the base to the roofing surface, the fastener penetrating the roofing surface.

FIG. 8 illustrates the use of a mastic or other adhesive 32 between base 18 and roof 4 to adhere base 18, and thus PV module support assembly 12, to the roof. FIG. 9 illustrates the use of a roof-penetrating bolt 34 to secure base 18 and thus support assembly 12 to the roof. Mechanical fasteners which do not penetrate roof 4 could also be used in lieu of bolt 34.

Figure 10:
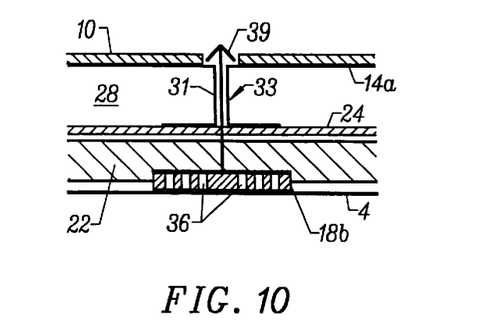
FIG. 10 illustrates the use of a porous base embedded within the foam, the foam penetrating through the pores to adhere directly to the building surface.

In FIG. 10 a base 18b is used. Base 18a is a porous base having a number of through-holes 36 through which sprayed-on insulation layer 22 can pass so that the insulation passing through through-holes 36 can bond to roof 4 to help secure base 18a to roof 4.

Figure 11:
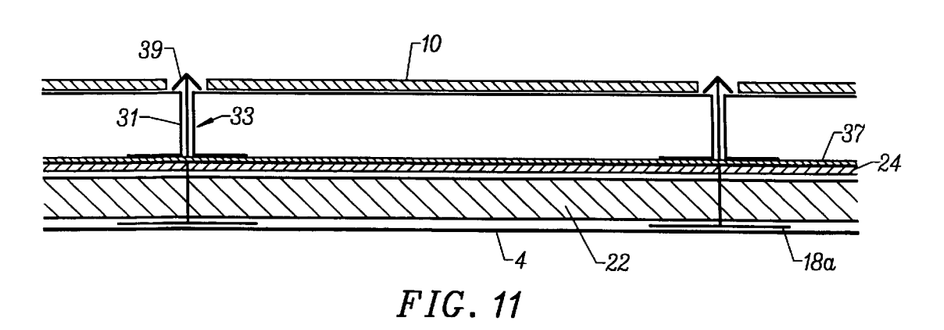
FIG. 11 illustrates the use of a radiant barrier adjacent to the weather-resistant layer.

FIG. 11 illustrates a PV building assembly similar to the roofing assembly of FIG. 3, but including a radiant barrier 37 mounted beneath PV module 10 and against layer 24.

Radiant barrier 37 is used to help reduce the transfer of radiant heat to roof 4. Typical radiant barriers can include sheet or foil aluminum, galvanized steel, metallic foils, metallized plastic film metallized coatings, or other coating over the foam layer. Radiant barrier 37 can be applied to the back of PV module 10 so that, in such case, radiant barrier 37 is a part of PV module 10. A suitable PV module 10, with or without a radiant barrier 37, can be obtained from PowerLight Corporation, Berkeley, Calif.

Figure 12:
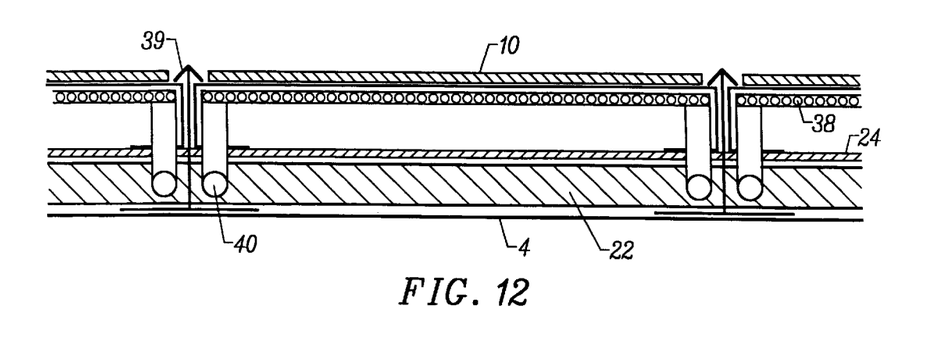
FIG. 12 illustrates the use of thermal conduits adjacent to the underside of the PV modules for heat transfer between a fluid in the thermal conduits and the PV module.

FIG. 12 illustrates a further embodiment of the invention in which a PV building assembly is made using an array of thermal energy collecting conduits 38 situated directly beneath and in thermal contact with PV modules 10. The use of conduits 38 permits thermal energy to be conducted away from or to PV modules 10. The heat transfer fluid can be directed to and from conduits 38 through a conduit 40 embedded within insulation layer 22. The use of conduits 38 helps keep PV modules 10 from overheating by transferring heat away from the modules. Also, in certain situations it may be desired to heat PV modules 10 to, for example, melt standing snow off their top surfaces to facilitate electricity collection.

Figure 13:
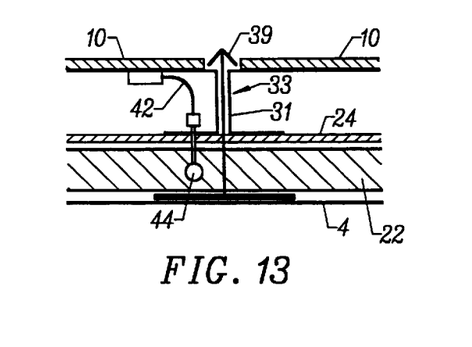
FIG. 13 illustrates electrical wiring embedded in a conduit within the continuous insulation layer.

FIG. 13 illustrates electrical wiring 42 running through an electrical conduit 44 embedded within insulation layer 22. Embedding the electrical conduit 44 in the insulation layer 22 serves as a thermal and UV protection for said wiring. The electrical conduit 44 can be either rigid metal conduit, plastic conduit, plastic sheathing, or other. The electrical energy from wiring 42 can be used to, for example, charge batteries or transformed into alternating current for delivery to a power grid.

Figure 14:
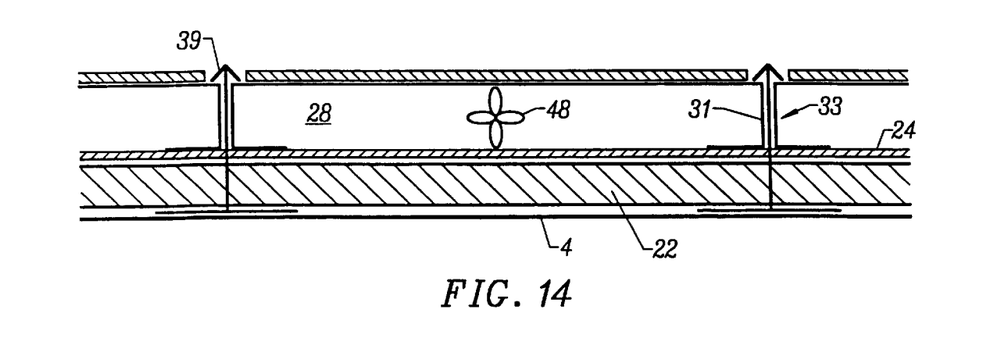
FIG. 14 illustrates the use of forced air ventilation of the air cavity between the PV module and the insulation layer for heat transfer from the PV building assembly to a heat collector system.

FIG. 14 illustrates a further embodiment of the invention in which a fan 48 is installed to force air through air cavity 28, thereby reducing the operating temperature of the PV modules and collecting heat for use within the building. This heat may be used to meet thermal energy needs of various building systems such as building conditioning services, hot water supply systems, or manufacturing process systems.

In use, bases 18 of support assemblies 12 are positioned on a building surface, such as roof 4, at the desired locations according to the layout of the array of PV modules. Bases 18 are commonly secured to roof 4 or side 6 as discussed with reference to FIGS. 7–10. Legs 16 extend upwardly from base 18. Conduits 40, 44, if used, are positioned on bases 18. The base portions 46 of perimeter units 30 are located to surround the array of PV modules 10. Thermal insulation layer 22 is preferably a foam insulation layer having an insulating value (R value) of about 3 to 7 per inch (3–7 hr/BTU ft$^2$ OF per inch thickness). Insulation layer 22 is typically formed by spraying on a layer of polyurethane foam to a thickness of about ½" to 3" to achieve thermal insulation of about R-2 to R-21. Weather-resistant layer 24 is then applied to the upper surface of insulation layer 22 for a good water-tight seal to the insulation layer. PV modules 10 are then mounted to bodies 14, typically using adhesives, clips, or other quick-connecting fasteners. When PV module support assemblies 12a (see FIGS. 5a–14) are used instead of support assemlbies 12 (see FIGS. 1–5), each body 14a, with a PV module 10 mounted thereto, is secured between the upstanding hold-downs by temporarily deflecting keepers 39 downwardly until the base of L-shaped stand-off 31 lies adjacent to layer 24, at which time keepers 39 snap back into the position illustrated in the figures. Appropriate electrical and thermal connections are then made through conduits 40, 44.

Legs 16 and hold-downs 33 can be made of a variety of materials including metal, plastic or other structural materials. Bodies 14 can be integral with legs 16 or can be attached to the upper ends of leg 16 with snap-on clip/pin connections made of metal, plastic or other appropriate structural materials. Bases 18 can be made of concrete pavers, foam-backed roofing pavers, sheet metal, plywood, or other structural materials. When bases 18 are made of heavy materials, this helps to counteract wind-induced uplift and sliding forces by virtue of their weight alone. However, by being embedded within insulation layer 22, and also by being fastened to the building surface, such as using an adhesive or mechanical fasteners, additional stability and mounting strength is achieved.

Insulation layer 22 and weather-resistant coating 24 may constitute the only building surface water-proofing membrane. Alternatively, insulation layer 22 and weather-resistant coating 24 may provide an additional waterproofing mechanism over a typical building membrane. Layer 24 may include a radiant barrier material coating. Also, an additional radiant barrier may be suspended within air cavity 28 to further retard heat transfer. PV building assembly 2 preferably has a weight of only about 1 to 4 pounds per square foot.

Other modifications and variations can be made to the disclosed embodiments without departing from the subject of the invention as defined in the following claims.

Each patent, patent application and printed publication referred to above is incorporated by reference.

What is claimed is:

1. A photovoltaic (PV) building assembly comprising:
   a building support surface;
   a continuous thermal insulation layer covering a chosen area of the building support surface, said insulation layer comprising an outer surface;
   a PV module;
   a PV module support assembly comprising:
      a base embedded within the continuous insulation layer between the outer surface and the building support surface so at least a portion of said base is spaced-apart from the outer surface of said insulation layer; and
      an outer portion extending from the base and supporting said PV module at a position spaced-apart from the insulation layer; and
   means for securing the PV module support assembly to the building support surface.

2. The assembly according to claim 1 wherein said outer portion comprises a body, to which the PV module is secured, a stand-off situated between the body and the insulation layer, and a hold-down biasing the body towards the insulation layer.

3. The assembly according to claim 2 wherein the hold-down comprises an extension, having an inner end at the base and an outer end, and resilient keepers at the outer end of the extension.

4. The assembly according to claim 1 wherein said chosen area is the entire building support surface.

5. The assembly according to claim 1 wherein the building support surface is a roof.

6. The assembly according to claim 1 wherein said outer portion comprises a body to which the PV module is secured.

7. The assembly according to claim 6 wherein said body is a generally planar member.

8. The assembly according to claim 6 wherein said body is substantially the same size as the PV module.

9. The assembly according to claim 1 wherein the PV module comprises a support substrate, secured to the outer portion, and a PV cell, supported by the substrate.

10. The assembly according to claim 1 wherein all of said base is spaced-apart from said outer surface of said insulation layer.

11. The assembly according to claim 1 wherein said outer portion comprises a body, to which the PV module is secured, and a leg, securing the body to the base.

12. The assembly according to claim 1 wherein said outer portion comprises a leg securing the PV module to the base.

13. The assembly according to claim 12 wherein said leg comprises a plurality of legs.

14. The assembly according to claim 1 wherein said outer portion is sized and configured to provide a cooling air cavity between the PV module and the outer surface of the insulation layer.

15. The assembly according to claim 1 wherein said outer portion is sized and configured to arrange the PV module at an angle to the outer surface of the insulation layer.

16. The assembly according to claim 15 wherein said outer portion comprises a first angled portion, to which the PV module is secured, and a second angled portion, said second angled portion being porous to permit air flow therethrough.

17. The assembly according to claim 1 wherein said outer portion is sized and configured to arrange the PV module parallel to the outer surface of the insulation layer.

18. The assembly according to claim 1 wherein said insulation layer is a foam insulation layer.

19. The assembly according to claim 1 wherein the base embedded within the continuous insulation layer at least partially serves as said securing means.

20. The assembly according to claim 19 wherein said base has through-holes formed therein.

21. The assembly according to claim 20 wherein said insulation layer is a foam insulation layer and at least some of said through-holes are sized so said foam insulation layer passes through said through-holes and adheres to said support surface.

22. The assembly according to claim 1 wherein said base has a weight sufficient to help counteract wind-induced uplift and sliding forces.

23. The assembly according to claim 1 wherein the securing means comprises at least one of the following:
   an adhesive suitable for adhering said base to the support surface; and
   a mechanical fastener adapted to secure the base to the support surface.

24. The assembly according to claim 23 wherein the mechanical fastener penetrates the support surface.

25. The assembly according to claim 1 further comprising a weather-resistant layer covering the outer surface of the insulation layer.

26. The assembly according to claim 25 wherein the weather-resistant layer comprises an elastomeric material.

27. The assembly according to claim 1 wherein the base lies against the building surface.

28. The assembly according to claim 1 further comprising a thermal energy collector mounted between the PV module and the outer surface of the insulation layer.

29. The assembly according to claim 28 wherein the thermal energy collector is mounted touching the PV module to enhance conductive heat flow.

30. The assembly according to claim 28 wherein the thermal energy collector comprises a plurality of tubes in thermally conductive contact with the PV module.

31. The assembly according to claim 30 wherein the thermal energy collector comprises a fluid conduit, fluidly coupled to the tubes, embedded within the continuous insulation layer.

32. The assembly according to claim 28 wherein the thermal energy collector comprises a fluid conduit embedded within the continuous insulation layer.

33. The assembly according to claim 1 further comprising a wire conduit embedded within the continuous insulation layer.

34. The assembly according to claim 1 comprising a plurality of said PV modules and PV module support assemblies forming an array of said PV modules, said array having a periphery.

35. The assembly according to claim 34 further comprising a perimeter unit mounted along said periphery of said array.

36. The assembly according to claim 35 wherein said perimeter unit is mounted external of said insulation layer.

37. The assembly according to claim 1 wherein said insulation layer has a thermal insulation rating of at least about R2.

38. The assembly according to claim 1 wherein said insulation layer has a thermal insulation R value of at least about 4 per inch.

39. The assembly according to claim 1 wherein said insulation layer comprises a foam insulation layer.

40. The assembly according to claim 39 wherein said foam insulation layer is a sprayed-on foam insulation layer.

41. A photovoltaic (PV) building assembly comprising:
   a building support surface;
   a continuous, sprayed-on foam insulation layer covering the building support surface, said insulation layer comprising an outer surface;
   a plurality of PV modules;
   a plurality of PV module support assemblies, each said support assembly comprising:
      a base embedded within the continuous insulation layer so said base is spaced-apart from the outer surface of said insulation layer;
      an outer portion extending from the base and supporting said PV module at a position spaced-apart from the insulation layer;
   means for securing the PV module support assembly to the building support surface;
   said outer portion being sized and configured to provide a cooling air cavity between the PV module and the outer surface of the insulation layer; and
   said plurality of said PV modules and PV module support assemblies forming an array of said PV modules.

42. The assembly according to claim 41 wherein said base embedded within said insulation layer at least partially serves as said securing means, the securing means further comprising at least one of the following:
   an adhesive adhering said base to the support surface;
   a mechanical fastener adapted to secure the base to the support surface;
   the base having a weight sufficient to help counteract wind-induced uplift and sliding forces; and
   said base has holes, extending therethrough to said support surface, sized so when said insulation layer is a foam insulation layer said foam insulation layer passes through said holes and adheres to said support surface.

43. A method for supporting a photovoltaic (PV) module over a building surface comprising:
   providing a PV assembly comprising a PV module support assembly, including a base and an outer portion, and PV module;
   positioning the base adjacent to a building surface;

securing the base to the building surface, said securing step being at least partially carried out by applying a continuous insulation layer over and to the base and the building surface thereby embedding the base within the insulation layer with a part of the outer portion extending past an outer surface of the insulation layer; and mounting the PV module to said part of the outer portion.

44. The method according to claim 43 wherein said base securing step further comprises the step of adhering said base to said building surface using an adhesive between said base and said building surface.

45. The method according to claim 43 wherein said continuous insulation layer applying step is carried out using a foam insulation.

46. The method according to claim 43 further comprising the step of forming a weather-resistant layer over the outer surface of the insulation layer.

47. A photovoltaic (PV) building assembly comprising:
a building support surface;
a continuous insulation layer covering a chosen area of the building support surface, said insulation layer comprising an outer surface;
a PV module;
a PV module support assembly comprising:
a base embedded within the continuous insulation layer so at least a portion of said base is spaced-apart from the outer surface of said insulation layer; and
an outer portion extending from the base and supporting said PV module at a position spaced-apart from the insulation layer;
means for securing the PV module support assembly to the building support surface; and
wherein said outer portion comprises a body, to which the PV module is secured, a stand-off situated between the body and the insulation layer, and a hold-down biasing the body towards the insulation layer.

48. The assembly according to claim 47 wherein the hold-down comprises an extension, having an inner end at the base and an outer end, and resilient keepers at the outer end of the extension.

49. A photovoltaic (PV) building assembly comprising:
a building support surface;
a continuous insulation layer covering a chosen area of the building support surface, said insulation layer comprising an outer surface;
a PV module;
a PV module support assembly comprising:
a base embedded within the continuous insulation layer so at least a portion of said base is spaced-apart from the outer surface of said insulation layer; and
an outer portion extending from the base and supporting said PV module at a position spaced-apart from the insulation layer;
means for securing the PV module support assembly to the building support surface;
wherein the base embedded within the continuous insulation layer at least partially serves as said securing means; and
wherein said base has through-holes formed therein.

50. The assembly according to claim 49 wherein said insulation layer is a foam insulation layer and at least some of said through-holes are sized so said foam insulation layer passes through said through-holes and adheres to said support surface.

51. A photovoltaic (PV) building assembly comprising:
a building support surface;
a continuous insulation layer covering a chosen area of the building support surface, said insulation layer comprising an outer surface;
a PV module;
a PV module support assembly comprising:
a base embedded within the continuous insulation layer so at least a portion of said base is spaced-apart from the outer surface of said insulation layer; and
an outer portion extending from the base and supporting said PV module at a position spaced-apart from the insulation layer;
means for securing the PV module support assembly to the building support surface; and
wherein the base lies against the building surface.

52. A photovoltaic (PV) building assembly comprising:
a building support surface;
a continuous insulation layer covering a chosen area of the building support surface, said insulation layer comprising an outer surface;
a PV module;
a PV module support assembly comprising:
a base embedded within the continuous insulation layer so at least a portion of said base is spaced-apart from the outer surface of said insulation layer; and
an outer portion extending from the base and supporting said PV module at a position spaced-apart from the insulation layer;
means for securing the PV module support assembly to the building support surface; and
a thermal energy collector mounted between the PV module and the outer surface of the insulation layer.

53. The assembly according to claim 52 wherein the thermal energy collector is mounted touching the PV module to enhance conductive heat flow.

54. The assembly according to claim 52 wherein the thermal energy collector comprises a plurality of tubes in thermally conductive contact with the PV module.

55. The assembly according to claim 54 wherein the thermal energy collector comprises a fluid conduit, fluidly coupled to the tubes, embedded within the continuous insulation layer.

56. The assembly according to claim 52 wherein the thermal energy collector comprises a fluid conduit embedded within the continuous insulation layer.

57. A photovoltaic (PV) building assembly comprising:
a building support surface;
a continuous insulation layer covering a chosen area of the building support surface, said insulation layer comprising an outer surface;
a PV module;
a PV module support assembly comprising:
a base embedded within the continuous insulation layer so at least a portion of said base is spaced-apart from the outer surface of said insulation layer; and
an outer portion extending from the base and supporting said PV module at a position spaced-apart from the insulation layer;
means for securing the PV module support assembly to the building support surface; and
a wire conduit embedded within the continuous insulation layer.

58. A photovoltaic (PV) building assembly comprising:

a building support surface;

a continuous insulation layer covering a chosen area of the building support surface, said insulation layer comprising an outer surface;

a plurality of PV modules;

a plurality of PV module support assemblies each comprising:
- a base embedded within the continuous insulation layer so at least a portion of said base is spaced-apart from the outer surface of said insulation layer; and
- an outer portion extending from the base and supporting said PV module at a position spaced-apart from the insulation layer;

means for securing the PV module support assemblies to the building support surface;

the plurality of said PV modules and PV module support assemblies forming an array of said PV modules, said array having a periphery; and a perimeter unit mounted along said periphery of said array.

59. The assembly according to claim 58 wherein said perimeter unit is mounted external of said insulation layer.

60. A photovoltaic (PV) building assembly comprising:

a building support surface;

a continuous insulation layer covering a chosen area of the building support surface, said insulation layer comprising an outer surface;

a PV module;

a PV module support assembly comprising:
- a base embedded within the continuous insulation layer so at least a portion of said base is spaced-apart from the outer surface of said insulation layer; and
- an outer portion extending from the base and supporting said PV module at a position spaced-apart from the insulation layer;

means for securing the PV module support assembly to the building support surface; and wherein said insulation layer comprises a sprayed on foam insulation layer.

* * * * *